US006639362B1

(12) United States Patent
Scott et al.

(10) Patent No.: US 6,639,362 B1
(45) Date of Patent: Oct. 28, 2003

(54) HIGH PRESSURE DISCHARGE LAMP

(75) Inventors: Curtis Edward Scott, Mentor, OH (US); Jack M. Strok, Garrettsville, OH (US); Charles D. Greskovich, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 211 days.

(21) Appl. No.: 09/707,407

(22) Filed: Nov. 6, 2000

(51) Int. Cl.[7] .................................................. H01K 1/50
(52) U.S. Cl. ........................ 313/578; 313/638; 501/152
(58) Field of Search ................................ 313/578, 567, 313/637, 638; 501/127, 153, 152

(56) References Cited

U.S. PATENT DOCUMENTS

| 4,580,075 A | * | 4/1986 | Strok | 313/25 |
| 4,633,137 A | * | 12/1986 | Scott et al. | 313/634 |
| 5,625,256 A | * | 4/1997 | Tiedt et al. | 313/493 |
| 5,682,082 A | * | 10/1997 | Wei et al. | 313/573 |

\* cited by examiner

Primary Examiner—Robert H. Kim
Assistant Examiner—Elizabeth Gemmell
(74) Attorney, Agent, or Firm—Fay, Sharpe, Fagan, Minnich & McKee, LLP

(57) ABSTRACT

An arc discharge vessel having electrodes disposed therein, a fill within the discharge vessel wherein the arc discharge vessel is comprised of alumina including the following dopants in parts per million: $50 \leq MgO \leq 1500$; $100 \leq HFO_2 \leq 1500$; $0 \leq ZrO_2 \leq 700$; $0 \leq Y_2O_3 \leq 300$; $0 \leq Sc_2O_3 \leq 1000$; $0 \leq Dy_2O_3 \leq 1000$; $0 \leq Tb_2O_3 \leq 1000$; with the proviso that at least 5 ppm $Y_2O_3$, $Sc_2O_3$, $Dy_2O_3$, $Tb_2O_3$, or mixtures thereof is included.

18 Claims, 1 Drawing Sheet

HIGH PRESSURE DISCHARGE LAMP

BACKGROUND OF THE INVENTION

The present invention relates to a high intensity discharge lamp (HID). More particularly, this invention relates to a high pressure discharge lamp having increased life and improved lumen maintenance.

Many designs for HID lamps, and in particular high pressure sodium (HPS) lamps, are known in the art. These lamps typically have a quartz, polycrystalline alumina (PCA), or a single crystal alumina (sapphire) arc tube filled with a mixture of gases, such amalgams of sodium and mercury, which form an arc discharge. Sodium and mercury components of the fill material are primarily responsible for the light output characteristics of the lamp. For example, the ratio of the mixture effects the color spectrum of the light output. However, it should be noted that mercury free lamps are also being developed which would benefit from the present invention.

Metal halide lamps of this type are generally comprised of an arc discharge chamber surrounded by a protective envelope. The arc chamber includes the fill of light emitting elements such as sodium and rare earths (e.g. scandium, indium, dysprosium, neodymium, praseodymium, cerium, and thorium) in the form of a halide, optionally mercury, and optionally an inert gas such as krypton, argon or xenon.

It has been found that the life of metal halide lamps is frequently limited by the loss of the sodium portion of the metal halide fill during lamp operation via sodium ion diffusion through the arc chamber. More particularly, fused quartz and alumina are somewhat porous to a sodium ion, and during lamp operation, energetic sodium ions pass from the arc plasma through the chamber wall and condense in the region between the arc chamber and the outer jacket or envelope of the lamp. The lost sodium is then unavailable to the arc discharge and can no longer contribute its characteristic emissions, causing the light output to gradually diminish, and causing the color to shift from white towards blue. In addition, the arc becomes more constricted, and in a horizontally operated lamp, the arc may bow against and soften the arc chamber wall. Sodium loss may also cause the operating voltage of the lamp to increase to the point where the arc can no longer be sustained by the ballast and failure of the lamp may result.

Ceramics doped with MgO (200–1500ppm MgO in the alumina) and used in lamps have been shown to be susceptible to darkening the outer jacket when lamps are operated at wattages above the design space of the ceramic arc tube. Darkening of the glass outer jacket has been linked to a combination of evaporation of the ceramic arc chamber and sodium loss through the walls of the arc tube due to reaction and diffusion mechanisms. This can limit lumen output and the useful life of the lamp. The effect is problematic in newer designs where the sodium-mercury dose weight must be reduced for environmental reasons, or to prevent a cycling phenomenon at end of life.

In addition to the sodium diffusion, the sodium in the arc can react with the alumina at the grain boundaries to form sodium aluminate, which adversely affects the structural integrity of the tube and shortens lamp life. Discharge lamps are being designed for ever increasing internal sodium partial pressure within the alumina arc tube to improve the color rendition and provide a whiter emitted light. However, higher internal sodium pressure further shortens lamp life due to increased rate of sodium loss from the arc chamber. Progressive sodium loss results in a corresponding continual rise in the lamp operating voltage, a decrease of both correlated color temperature and color rendering index, and a color shift from white to pink. Also, the sodium which migrates through the arc chamber wall deposits on the inside wall of the evacuated outer lamp envelope causing a brownish stain on the envelope which, in turn, further reduces the light output of the lamp.

In an attempt to reduce the effect of sodium diffusion through the arc chamber, the skilled artisan has historically relied on coating the arc chamber with sodium diffusion resistant materials. Attempts to solve diffusion problems have included depositing aluminum silicate and titanium silicate layers on the outside surfaces of the arc tube, as described in U.S. Pat. Nos. 4,047,067 and 4,017,163 respectively. Alternatively, U.S. Re. Pat. No. 30,165 discloses applying a vitreous metal phosphate and arsenate coating on the inner surface of the arc tube. In contrast, U.S. Pat. No. 5,032,762 discloses beryllium oxide coatings.

While these methods have met with success in reducing sodium diffusion, the methods also require additional processing steps associated with applying a coating. Furthermore, the lamp's high temperature of operation, and frequently corrosive environment of use may destroy the adherence between coating and arc chamber substrate. Moreover, cracking and/or peeling can result, exposing the quartz to sodium ions and allowing diffusion to occur. Accordingly, it would be desirable in the art to have a arc tube material which reduces sodium diffusion without the application of additional coatings.

The manufacture of polycrystalline alumina (PCA) and single crystal alumina (sapphire) HPS arc discharge lamps is known. U.S. Pat. Nos. 3,026,210; 4,150,317 and 4,285,732 to Coble, Alaska et al and Charles et al., respectively, disclose the production of a high density alumina body having improved visible light transmission using relatively pure alumina powder and small amounts of magnesia. U.S. Pat. No. 4,285,732 further teaches adding zirconia and hafnia to the magnesia-doped alumina to reduce the chances of precipitating a spinel phase and exaggerated or run away grain growth during sintering.

A need exists for producing an alumina arc tube (PCA or sapphire) having a reduced tendency to permit sodium diffusion and/or binding.

SUMMARY OF THE INVENTION

According to an exemplary embodiment of the present invention, a high pressure discharge lamp is disclosed. The lamp includes a discharge vessel having a ceramic wall. Electrodes and a fill are disposed within the discharge vessel. The ceramic forming the discharge vessel wall is comprised of alumina including the following dopants in parts per million:

$50 \leq MgO \leq 1500$
$100 \leq HfO_2 \leq 1500$
$0 \leq ZrO_2 \leq 700$
$70 \leq Y_2O_3 \leq 300$
$0 \leq Sc_2O_3 \leq 1000$
$0 \leq Dy_2O_3 \leq 1000$
$0 \leq Tb_2O_3 \leq 1000$ with the proviso that at least 5 ppm $Y_2O_3$, $Sc_2O_3Dy_2O_3$, $Tb_2O_3$ or mixtures thereof is included.

DETAILED DESCRIPTION OF THE INVENTION

Figure 1:
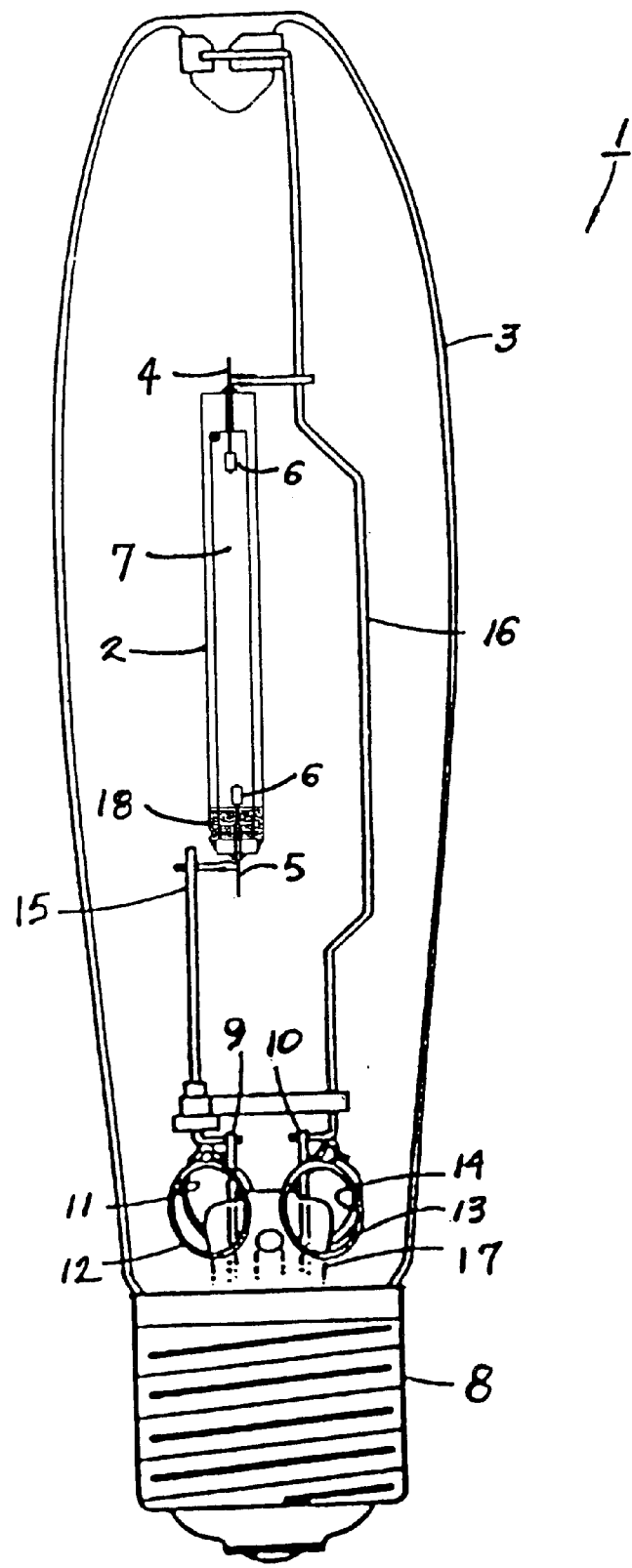
FIG. 1 is a diagramatic view of a representative HID lamp.

Referring now to the drawings, which illustrate a preferred embodiment of the invention only and are not intended to limit same, FIG. 1 shows a high pressure sodium lamp 1, which includes a high pressure alumina discharge vapor arc chamber of arc tube 2 disposed within a transparent outer vitreous envelope 3. Arc tube 2 contains under pressure an arc producing medium comprising sodium, preferably mercury, and preferably xenon as a starting gas. The xenon fill gas has a cold fill pressure from about 10 to 500 torr, preferably about 200 torr. During operation, the xenon pressure increase to about 8 times the cold fill pressure. The partial pressure of the sodium ranges from 30 to 1000 torr during operation, preferably about 70 to 150 torr for high efficacy. Electrical niobium lead wires 4 and 5 allow coupling of electrical energy to tungsten electrodes 6, containing an electron emissive material, and disposed within the discharge chamber 2 so as to enable excitation of the fill 7 contained therein. Sealing frit bonds the lead wires 4 and 5 to the alumina of the arc chamber 2 at either end. Sealing is first done at lead wire 4. Sealing at lead wire 5 is accomplished using an alumina bushing feedthrough assembly. Lead wires 4 and 5 are electrically connected to the threaded screw base 8 by means of support members 15 and 16, and inlead wires 9 and 10, which extend through stem 17.

Initiation of an arc discharge between electrodes 6 requires a starting voltage pulse of 2 to 4 kilo volts. This ionizes the starting gas, initiating current flow which raises the temperature in the arc tube 2 and vaporizes the sodium and zinc contained therein. Arc discharge is then sustained by the ionized vapor and the operating voltage stabilizes.

The lamp 1 also includes a niobium foil heat-reflective band 18, which maintains a higher operation of temperature at the end of arc chamber 2 toward the lamp base as compared to the opposite end. As a result, the unvaporized amounts of metallic dose components, i.e., sodium and mercury, reside at the colder end of arc chamber 2 during operation. The lamp 1 is designed to prohibit contact of liquid sodium with the sealing frit to avoid life-limiting reactions and the possibility of rectification (high ballast current) during startup.

In the present invention, fill 7 contained within the outer envelope 3 consists of sodium and a starting gas, preferably xenon. The metallic dose (at the monolithic alumina corner) is introduced in conjunction with the xenon starting gas. Other acceptable starting gases would include any non-reactive ionizable gas such as a noble gas sufficient to cause the establishment of a gaseous arc discharge.

The discharge chamber 7 is comprised of alumina. The main body of the discharge chamber can be constructed by any means known to those skilled in the art such as die pressing a mixture of ceramic powder in a binder into a solid cylinder. Alternatively, the mixture can be extruded or injection molded. Generally, the ceramic powder/binder mixture comprises 75–98% by weight ceramic powder and 2–25% by weight organic binder. However, this mixture can vary depending on the process used to form the discharge chamber. The ceramic powder may comprise alumina ($Al_2O_3$) having a purity of at least 99.98% and a surface area of about 2–10 meters squared per gram. In an exemplary embodiment, alumina refractory granules of average particle size in range of 400 to 800 microns and particles of the metal powder could be combined. In general, free flowing aluminum granules, suitable for metalizing as described can be obtained by wet milling one kilogram of 99.98% purity alpha or gamma alumina powder or a mixture of alpha and gamma, with an average particle size of 0.3 microns in a surface area of 30 meters squared per gram for six hours, two liters of dionized water together with 0.05 weight percent of magnesia to promote densification and inhibit grain growth. The slurry is subsequently dried, sieved through a micron mesh and finally rolled to aglomerate most of the fine particles below 50 microns in diameter. The granulated material is subsequently sieved through various mesh sizes to give a final size within the specified range of diameters.

Alumina powder may be doped with magnesia to inhibit grain growth, for example in an amount equal to 0.03–0.2%, preferably 0.05% by weight of the alumina. Binders which may be used individually or in combination include organic polymers, such as polyols, polyvinyl alcohol, vinyl acetates, acrylates, cellulosics, polyesters and stearates.

Subsequent to formation, the binder is removed, typically by thermopyrollisis, to form a bisque-fired part. The thermopyrollisis may be conducted, for example, by heating the green part in air from room temperature.

After assembly of the tubes, a plurality of tubes may be loaded into a furnace and sintering may be carried out by heating the bisque-fired parts and hydrogen having a dew point of about 10–15° C. Typically, the temperature is increased from room temperature to about 1850° C. and sintered for 3 to 10 hours.

In accord with the invention, the alumina (or whatever ceramic material is being used) will include the following dopants in parts per million:

$50 \leq MgO \leq 1500$ $100 \leq HfO_2 \leq 1500$ $0 \leq ZrO_2 \leq 700$ $0 \leq Y_2O_3 \leq 300$ $0 \leq Sc_2O_3 \leq 1000$ $0 \leq Dy_2O_3 \leq 1000$ $0 \leq Tb_2O_3 \leq 1000$ with the proviso that at least 5 ppm $Y_2O_3$, $Sc_2O_3$, $Dy_2O_3$, $Tb_2O_3$ or mixtures thereof is included.

Preferably, the alumina composition will include at least 100 ppm $ZrO_2$. In a particularly preferred form of the invention, yttrium will comprise at least 5 ppm of the alumina. In a further preferred form of the invention at least one of $Sc_2O_3>0$, $Dy_2O_3>0$, and $Tb_2O_3>0$, $[_2O_3]>0$, will further comprise the alumina composition.

While the invention has been described with reference to certain preferred embodiments, it is intended to cover all changes and modifications thereof that are made without departing from the scope and spirit of the invention. For example, the invention is intended to encompass discharge chambers at any shape—whether or not similar to that of FIG. 1—and for any type of lamp.

What is claimed is:

1. An arc discharge vessel having electrodes disposed therein, a fill within the discharge vessel wherein the arc discharge vessel is comprised of alumina including the following dopants in parts per million:

$50 \leq MgO \leq 1500$ $100 \leq HfO_2 \leq 1500$ $0 \leq ZrO_2 \leq 700$ $0 \leq Y_2O_3 \leq 300$ $0 \leq Sc_2O_3 \leq 1000$ $0 \leq Dy_2O_3 \leq 1000$ $0 \leq Tb_2O_3 \leq 1000$ with the proviso that at least 5 ppm $Sc_2O_3$, $Dy_2O_3$, $Tb_2O_3$, or mixtures thereof is included.

2. The lamp of claim 1 wherein said fill comprise sodium.

3. The lamp of claim 2 wherein said fill further comprises xenon.

4. The lamp of claim 1 wherein said alumina includes at least 100 ppm $ZrO_2$.

5. The lamp of claim 1 wherein said alumina includes $Sc_2O_3>0$.

6. The lamp of claim 1 wherein said alumina includes $Dy_2O_3>0$.

7. The lamp of claim 1 wherein said alumina includes $Tb_2O_3>0$.

8. The lamp of claim 1 wherein said alumina includes $Y_2O_3>0$.

9. The lamp of claim 1 wherein said alumina includes at least two of said $Y_2O_3$, $Sc_2O_3$, $Dy_2O_3$, $Tb_2O_3$.

10. A free high pressure sodium vapor discharge lamp comprising:
   a vessel having a discharge space formed therein;
   end members hermetically sealing the vessel;
   electrical leads extending through the end members;
   electrodes disposed at the ends of the electric leads extending through the end members;
   the discharge space including sodium, a starting gas; and
   said vessel comprised of a ceramic including the following dopant in parts per million:
   $50 \leq MgO \leq 1500$
   $100 \leq HfO_2 \leq 1500$
   $0 \leq ZrO_2 \leq 700$
   $0 \leq Y_2O_3 \leq 300$
   $0 \leq Sc_2O_3 \leq 1000$
   $0 \leq Dy_2O_3 \leq 1000$
   $0 \leq Tb_2O_3 \leq 1000$
   with the proviso that at least 5 ppm $Sc_2O_3$, $Dy_2O_3$, $Tb_2O_3$, or mixtures thereof is included.

11. The lamp of claim 10 wherein said alumina includes at least 100 ppm $ZrO_2$.

12. The lamp of claim 10 wherein said alumina includes $Sc_2O_3>0$.

13. The lamp of claim 10 wherein said alumina includes $Dy_2O_3>0$.

14. The lamp of claim 10 wherein said alumina includes $Tb_2O_3>0$.

15. The lamp of claim 10 wherein said alumina includes $Y_2O_3>0$.

16. The lamp of claim 10 wherein said alumina includes at least two of said $Y_2O_3$, $Sc_2O_3$, $Dy_2O_3$, $Tb_2O_3$.

17. An arc tube comprised of a ceramic material including the following dopants in parts per million:
   $50 \leq MgO \leq 1500$
   $100 \leq HfO_2 \leq 1500$
   $0 \leq ZrO_2 \leq 700$
   $0 \leq Y_2O_3 \leq 300$
   $0 \leq Sc_2O_3 \leq 1000$
   $0 \leq Dy_2O_3 \leq 1000$
   $0 \leq Tb_2O_3 \leq 1000$
   with the proviso that at least 5 ppm $Sc_2O_3$, $Dy_2O_3$, $Tb_2O_3$, or mixtures thereof is included.

18. An arc discharge vessel having electrodes disposed therein, a fill within the discharge vessel wherein the arc discharge vessel consists essentially of alumina including the following dopants in parts per million:
   $50 \leq MgO \leq 1500$
   $100 \leq HfO_2 \leq 1500$
   $0 \leq Y_2O_3 \leq 300$
   $0 \leq Sc_2O_3 \leq 1000$
   $0 \leq Dy_2O_3 \leq 1000$
   $0 \leq Tb_2O_3 \leq 1000$
   with the proviso that at least 5 ppm $Sc_2O_3$, $Dy_2O_3$, $Tb_2O_3$, or mixtures thereof is included.

* * * * *